United States Patent
Ali et al.

(10) Patent No.: US 12,408,214 B2
(45) Date of Patent: Sep. 2, 2025

(54) CACHING CONFIGURATION PROFILES ASSOCIATED WITH CAPABILITY ID

(71) Applicant: Nokia Solutions and Networks Oy, Espoo (FI)

(72) Inventors: Amaanat Ali, Espoo (FI); Srinivasan Selvaganapathy, Bangalore (IN); Jing He, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 356 days.

(21) Appl. No.: 17/787,770

(22) PCT Filed: Dec. 24, 2019

(86) PCT No.: PCT/CN2019/127877
§ 371 (c)(1),
(2) Date: Jun. 21, 2022

(87) PCT Pub. No.: WO2021/127973
PCT Pub. Date: Jul. 1, 2021

(65) Prior Publication Data
US 2023/0345557 A1    Oct. 26, 2023

(51) Int. Cl.
*H04W 76/14*    (2018.01)
(52) U.S. Cl.
CPC ................... *H04W 76/14* (2018.02)
(58) Field of Classification Search
CPC ............... H04W 76/14; H04W 8/22
See application file for complete search history.

(56) References Cited

U.S. PATENT DOCUMENTS

2015/0156710 A1    6/2015    Montemurro et al.
2017/0332424 A1*   11/2017   Salot ................... H04W 40/005
(Continued)

FOREIGN PATENT DOCUMENTS

| CN | 101073528 A | 11/2007 |
| CN | 104083217 A | 10/2014 |

(Continued)

OTHER PUBLICATIONS

Extended European Search Report received for corresponding European Patent Application No. 19957947.5, dated Jun. 26, 2023, 8 pages.

(Continued)

*Primary Examiner* — Justin T Van Roie
(74) *Attorney, Agent, or Firm* — Lippes Mathias LLP (57) ABSTRACT

Example embodiments of the present disclosure relate to devices, methods, apparatuses and computer readable storage media of caching the configuration profiles associated with a capability ID. The method comprising receiving, at the first device and from a second device, a capability indication of the second device, the capability indication associated with at least one capability of the second device for performing radio access to the first device; determining a set of radio configuration profiles for the second device at least based on the capability indication, the set of radio configuration profiles indicating a plurality of available configuration parameters of the radio access; and transmitting the set of radio configuration profiles to the second device, to cause the second device to establish a connection with the first device. In this way, the additional network processing for generating a new radio configuration may be potentially saved and therefore the network efficiency for transmitting the radio configurations to the terminal device can be improved.

16 Claims, 5 Drawing Sheets

(56) References Cited

U.S. PATENT DOCUMENTS

| | | | |
|---|---|---|---|
| 2018/0020382 A1* | 1/2018 | Kim | H04W 8/22 |
| 2018/0332462 A1* | 11/2018 | Kim | H04W 28/02 |
| 2019/0020998 A1* | 1/2019 | Takahashi | H04W 4/70 |
| 2019/0124711 A1* | 4/2019 | Dai | H04W 36/0079 |
| 2019/0363843 A1 | 11/2019 | Gordaychik | |
| 2021/0105866 A1* | 4/2021 | Kavuri | H04W 76/27 |

FOREIGN PATENT DOCUMENTS

| | | |
|---|---|---|
| CN | 110475243 A | 11/2019 |
| WO | 2018/060968 A1 | 4/2018 |
| WO | 2018/229680 A1 | 12/2018 |
| WO | 2019/233396 A1 | 12/2019 |

OTHER PUBLICATIONS

Office action received for corresponding Indian Patent Application No. 202247042046, dated Nov. 10, 2022, 5 pages.

"3rd Generation Partnership Project; Technical Specification Group Radio Access Network; NR and Evolved Universal Terrestrial Radio Access (E-UTRA); Study on optimizations of UE radio capability signalling; (Release 16)", 3GPP TR 37.873, V16.0.0, Mar. 2019, pp. 1-16.

"3rd Generation Partnership Project; Technical Specification Group Services and System Aspects; Study on optimisations on UE radio capability signalling (Release 16)", 3GPP TR 23.743, V16.0.0, Mar. 2019, pp. 1-56.

"3rd Generation Partnership Project; Technical Specification Group Radio Access Network; NR; NR and NG-RAN Overall Description; Stage 2 (Release 15)", 3GPP TS 38.300, V15.6.0, Jun. 2019, pp. 1-99.

"3rd Generation Partnership Project; Technical Specification Group Radio Access Network; NR; Radio Resource Control (RRC) protocol specification (Release 15)", 3GPP TS 38.331, V15.6.0, Jun. 2019, pp. 1-519.

"3rd Generation Partnership Project; Technical Specification Group Radio Access Network; NG-RAN; Xn application protocol (XnAP) (Release 15)", 3GPP TS 38.423, V15.4.0, Jul. 2019, pp. 1-309.

"3rd Generation Partnership Project; Technical Specification Group Radio Access Network; NG-RAN; NG Application Protocol (NGAP) (Release 15)", 3GPP TS 38.413, V15.4.0, Jul. 2019, pp. 1-328.

International Search Report and Written Opinion received for corresponding Patent Cooperation Treaty Application No. PCT/CN2019/127877, date Oct. 10, 2020, 9 pages.

"Summary of email discussion [103bis#12][NR/UE cap SI] UE cap ID signalling options (MediaTek)", 3GPP TSG-RAN WG2 Meeting #104, R2-1816821, Agenda: 11.5.2, MediaTek Inc., Nov. 12-16, 2018, pp. 1-14.

"Discussion on ID based UE Capability transfer", 3GPP TSG-RAN WG2 meeting #103bis, R2-1814965, Agenda: 10.5.1, Intel Corporation, Oct. 8-12, 2018, 6 pages.

"Key aspects and signalling procedure for UE capability ID report", 3GPP TSG-RAN WG2#104, R2-1817676, Agenda: 11.5.2, Huawei, Nov. 12-16, 2018, 4 pages.

Office action received for corresponding Chinese Patent Application No. 201980102833.X, dated Apr. 20, 2023, 7 pages of office action and no page of translation available.

Office action received for corresponding Chinese Patent Application No. 201980102833.X, dated Mar. 21, 2024, 7 pages of office action and no page of translation available.

"3rd Generation Partnership Project; Technical Specification Group Radio Access Network; Evolved Universal Terrestrial Radio Access Network (E-UTRAN); S1 Application Protocol (S1AP) (Release 13)", 3GPP TS 36.413, V13.3.0, Jun. 2016, pp. 1-331.

* cited by examiner

CACHING CONFIGURATION PROFILES ASSOCIATED WITH CAPABILITY ID

RELATED APPLICATION

This application was originally filed as PCT Application No. PCT/CN2019/127877, filed on Dec. 24, 2019 of which is incorporated herein by reference in its entirety.

FIELD

Embodiments of the present disclosure generally relate to the field of telecommunication and in particular, to a device, method, apparatus and computer readable medium of caching the configuration profiles associated with a capability identifier (ID).

BACKGROUND

In third Generation Partnership Project (3GPP) Release 16 (Rel-16), it has been studied on optimisations on UE radio capability signalling. Some mechanisms are proposed to ensure that large radio capability containers are not frequently exchanged over the air interface leading to improvements in air interface capacity and improving latency of the underlying control plane procedures.

Currently, a user equipment (UE) may be in possession of up to 16 UE Capability IDs (UECAPID) that are assigned by the network in addition to a UE manufacturer provided UECAPID. Also, a UE may be assigned multiple UECAPID per Public Land Mobile Network (PLMN) depending on the network node filter that controls the size of the UE radio capabilities. The network can controls the UECAPID from the set of IDs, which may be allowed to be used by a specific UE. Naturally, the radio configuration(s) that may be assigned to a UE by a given network node depends on the UECAPID that the UE is using.

SUMMARY

In general, example embodiments of the present disclosure provide a solution of caching the configuration profiles associated with a capability ID.

In a first aspect, there is provided a first device. The first device comprises at least one processor; and at least one memory including computer program codes; the at least one memory and the computer program codes are configured to, with the at least one processor, cause the first device at least to receive, from a second device, a capability indication of the second device, the capability indication associated with at least one capability of the second device for performing radio access to the first device; determining a set of radio configuration profiles for the second device at least based on the capability indication, the set of radio configuration profiles indicating a plurality of available configuration parameters of the radio access; and transmit the set of radio configuration profiles to the second device, to cause the second device to establish a connection with the first device.

In a second aspect, there is provided a second device. The second device comprises at least one processor; and at least one memory including computer program codes; the at least one memory and the computer program codes are configured to, with the at least one processor, cause the second device at least to transmit a capability indication of the second device to a first device, the capability indication associated with at least one capability of the second device for performing radio access to the first device; receive a set of radio configuration profiles for the second device from the first device, the set of radio configuration profiles indicating a plurality of available configuration parameters of the radio access; and establish a connection with the first device based on the set of radio configuration profiles.

In a third aspect, there is provided a third device. The second device comprises at least one processor; and at least one memory including computer program codes; the at least one memory and the computer program codes are configured to, with the at least one processor, cause the third device at least to determine a set of radio configuration profiles corresponding to a capability indication of a second device, the capability indication associated with at least one capability of the second device for performing radio access to a first device, the set of radio configuration profiles indicating a plurality of available configuration parameters of the radio access and provide the set of radio configuration profiles to the first device.

In a fourth aspect, there is provided a method. The method comprises receiving, at the first device and from a second device, a capability indication of the second device, the capability indication associated with at least one capability of the second device for performing radio access to the first device; determine a set of radio configuration profiles for the second device at least based on the capability indication, the set of radio configuration profiles indicating a plurality of available configuration parameters of the radio access; and transmitting the set of radio configuration profiles to the second device, to cause the second device to establish a connection with the first device.

In a fifth aspect, there is provided a method. The method comprises transmitting, from a second device, a capability indication of the second device to a first device, the capability indication associated with at least one capability of the second device for performing radio access to the first device; receiving a set of radio configuration profiles for the second device from the first device, the set of radio configuration profiles indicating a plurality of available configuration parameters of the radio access; and establishing a connection with the first device based on the set of radio configuration profiles.

In a sixth aspect, there is provided a method. The method comprises determining a set of radio configuration profiles corresponding to a capability indication of a second device, the capability indication associated with at least one capability of the second device for performing radio access to a first device, the set of radio configuration profiles indicating a plurality of available configuration parameters of the radio access; and providing the set of radio configuration profiles to the first device.

In a seventh aspect, there is provided an apparatus comprising means for receiving from a second device, a capability indication of the second device, the capability indication associated with at least one capability of the second device for performing radio access to the first device; means for determine a set of radio configuration profiles for the second device at least based on the capability indication, the set of radio configuration profiles indicating a plurality of available configuration parameters of the radio access; and means for transmitting the set of radio configuration profiles to the second device, to cause the second device to establish a connection with the first device.

In an eighth aspect, there is provided an apparatus comprising means for transmitting, from a second device, a capability indication of the second device to a first device, the capability indication associated with at least one capability of the second device for performing radio access to the first device; means for receiving a set of radio configuration profiles for the second device from the first device, the set of radio configuration profiles indicating a plurality of available configuration parameters of the radio access; and means for establishing a connection with the first device based on the set of radio configuration profiles.

In a ninth aspect, there is provided an apparatus comprising means for determining a set of radio configuration profiles corresponding to a capability indication of a second device, the capability indication associated with at least one capability of the second device for performing radio access to a first device, the set of radio configuration profiles indicating a plurality of available configuration parameters of the radio access and means for providing the set of radio configuration profiles to the first device.

In a tenth aspect, there is provided a computer readable medium comprising a computer program for causing an apparatus to perform at least the method according to the fourth aspect.

In an eleventh aspect, there is provided a computer readable medium comprising a computer program for causing an apparatus to perform at least the method according to the fifth aspect.

In a twelfth aspect, there is provided a computer readable medium comprising a computer program for causing an apparatus to perform at least the method according to the sixth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 5 shows a flowchart of a method implemented at a third device in accordance with some example embodiments of the present disclosure;

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. An RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

Figure 1:
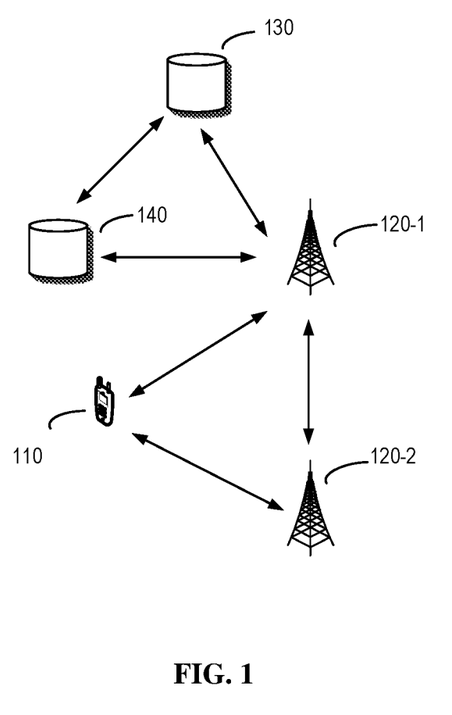
FIG. 1 shows an example communication network in which embodiments of the present disclosure may be implemented.

FIG. 1 shows an example communication network 100 in which embodiments of the present disclosure can be implemented. As shown in FIG. 1, the communication network 100 comprises network devices 120-1 and 120-2 (hereafter also referred to as network device 120 collectively or referred to as a first device 120-1 and a further first device 120-2 respectively) and a terminal device 110 (hereafter also referred to as a second device 110). The network devices 120-1 and 120-2 may communicate with the terminal device 110. The network devices 120-1 and 120-2 may communicate with each other. It is to be understood that the number of network devices and terminal devices shown in FIG. 1 is given for the purpose of illustration without suggesting any limitations. The communication network 100 may include any suitable number of network devices and terminal devices.

Furthermore, the communication network 100 may also include a 5G Next Generation Core node 130 (hereafter also referred to as a third device 130). It should be understood that the third device 130 may also be implemented as any suitable node or device in the Core Network (CN). The network devices 120-1 and 120-2 may communicate with the third device 130. The communication network 100 may also include a management node 140 (hereafter also referred to as a fourth device 140) at network management side. For example, the management node 140 may be implemented as a node for Operation, Administration and Maintenance (OAM). The management node 140 may communicate with the 5G Next Generation Core node 130 and any of network devices 120. It should be noted that the communication network 100 may also include other elements which are omitted for the purpose of clarity.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may use conform to any suitable standards including, but not limited to, New Radio Access (NR), Long Term Evolution (LTE), LTE- Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

As mentioned above, the study on optimisations for radio capability signalling of the terminal device has been agreed in 3GPP Rel-16. It is not expected that the large radio capability containers are frequently exchanged over the air interface. Some approaches are proposed to improve in air interface capacity and latency of the underlying control plane procedures.

A terminal device may be in possession of up to 16 Capability IDs, which may be referred to as UE Capability IDs (UECAPID), that are assigned by the network in addition to the UECAPID provided by a manufacturer of the terminal device. Also, a terminal device may be assigned multiple UECAPID per PLMN depending on the network node filter that controls the size of the terminal device radio capabilities. The network can control the UECAPID from the set of IDs, which may be allowed to be used by a specific terminal device. Naturally, the radio configuration(s) that may be assigned to a terminal device by a given network node depends on the UECAPID that the terminal device is using.

Furthermore, the radio configurations of the terminal device in a network are limited in number and most of the time the same radio configuration is issued to a specific terminal device when the underlying network condition remains the same. Hence, typically, for the terminal devices having similar capabilities, the radio reconfiguration message may be remained the same for a given set of underlying network conditions and the additional network processing for generating a new radio configuration may be potentially saved and therefore the network efficiency for transmitting the radio configurations to the terminal device can be improved.

Currently, 5G Next Generation Core (NGC) maintains mapping against set of UECAPID and associated radio capability information. The PLMN creates these UECAPID based on default capability information provided for each manufacturer ID by applying additional filter for the radio capability relevant for the current PLMN. The terminal device may store multiple such UECAPID for different PLMNs.

With the above as basis for obtaining the UECAPID, the complete capability information corresponds to UECAPID is obtained from NGC when the network device obtains the UECAPID from the terminal device on completion of security mode procedure. Upon the reception of the information, the network device may check the capability corresponds to the current cell and generate the RRC configuration based on this information. This step will be required every time for new connection.

In order to reduce the signalling overhead for the RRC configuration and improve the network efficiency, in the embodiments of the present disclosure, multiple radio configuration profiles may be defined for different capabilities, together bundling with different RRC states, e.g., INACTIVE or CONNECTED. These profiles and its associated identifiers may be configured in network device. When a network device receives UE-capability-Information for UECAPID from NGC, it checks the profiles applicable for this capability information and indicates the identifiers for these profiles back to NGC via an inter-node signalling (NGAP). This additional mapping is established when a specific UECAPID and its capability information has been received at the network device. For UE-capability-information retrieval from NGC for further new connections, NGC also provide this list of profiles along with UECAPID.

Figure 2:
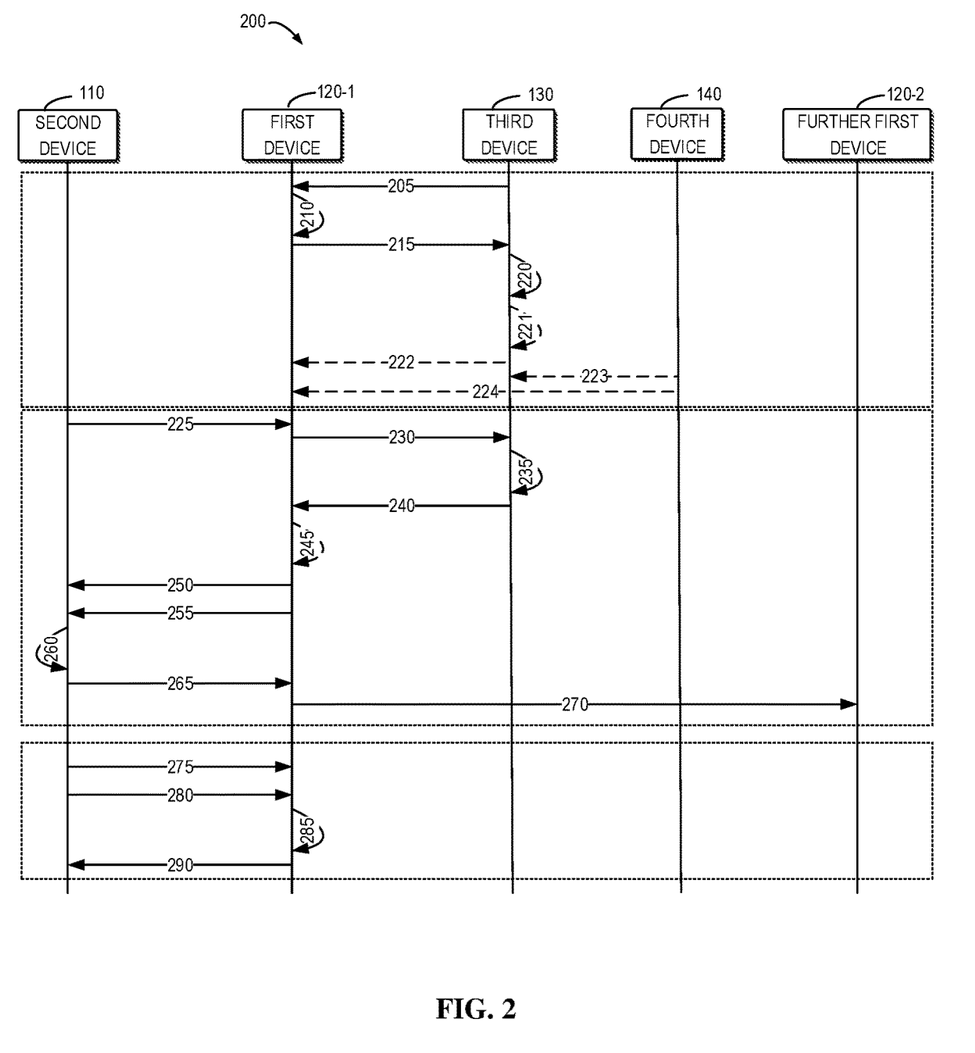
FIG. 2 shows a signaling chart illustrating a process of caching the configuration profiles associated with a capability ID according to some example embodiments of the present disclosure.

Principle and implementations of the present disclosure will be described in detail below with reference to FIGS. 2 to 5. FIG. 2 shows a signaling chart illustrating a process 200 caching the configuration profiles associated with a capability ID according to some example embodiments of the present disclosure. For the purpose of discussion, the process 200 will be described with reference to FIG. 1. The process 200 may involve the first device 120-1, the second device 110, the third device 130 and the further first device 120-2 as illustrated in FIG. 1. It would be appreciated that although the process 200 has been described in the communication system 100 of FIG. 1, this process may be likewise applied to other communication scenarios.

As shown in FIG. 2, the first device 120-1 may receive 205 a set of capability IDs and the corresponding capability information for each ID from the third device 130. The corresponding capability information for a capability ID may also be referred to as a capability pattern. For example, the capability IDs may be associated with a terminal device, e.g. the second device 110. Also, the capability IDs may be related to a plurality of terminal devices. For example, the capability information corresponding to the ID may include at least one radio capability supported by a terminal device, such as size of the antenna matrix, parameters related to the bandwidth and frequency, etc.

Meanwhile, the first device 120-1 may determine possible states of radio access of the terminal device, such as INACTIVATED, CONNECTED, etc. Based on the at least one radio capability supported by a terminal device (the second device 110, for example) indicated in the corresponding capability information and the possible states of radio access of the terminal device, the first device 120-1 may configure 210 a plurality of sets of reference radio configuration profiles for capability IDs and establish the correspondences of the plurality of sets of reference radio configuration profiles, the capability IDs and the possible states of radio access. For example, each of the reference radio configuration profile may indicate RRC configuration(s) to be applied in cell capable of MIMO and NR power saving feature. Each profile may also be assigned with RRC-configuration-identifier (RADIOCONFID).

For example, for one capability ID, one or more sets of reference radio configuration profiles may be configured. Furthermore, a same set of reference radio configuration profiles may be applicable for multiple capability IDs.

Then the first device 120-1 may transmit 215 the configured plurality of sets of reference radio configuration profiles and the correspondences to the third device 130. The third device 130 may indexing the plurality of sets of reference radio configuration profiles and associating the indices of the plurality of sets of reference radio configuration profiles and at least one state of the radio access with the capability IDs. That is, a mapping between the capability IDs and the plurality of sets of reference radio configuration profiles and corresponding state of the radio access may be maintained 220 in the third device 130. The actions 205-220 occur between the first device 120-1 and the third device 130 may be referred to as a mapping updating procedure, which may be implemented via inter-node signalling (NGAP).

Alternatively, the plurality of sets of reference radio configuration profiles and the correspondences of the plurality of sets of reference radio configuration profiles, the capability IDs and the possible states of radio access may be obtained from the third device 130. The third device 130 may be aware of capability IDs and the corresponding capability information for each ID and configure 221 the respective reference radio configuration profiles for each the capability ID. Then the plurality of sets of reference radio configuration profiles for capability IDs may be transmitted 222 from the third device 130 to the first device 120-1.

Further, it is possible that a predetermined set of radio configuration profiles for a specific capability ID may also be obtained from the fourth device 140, for example, an OAM node. The fourth device 140 may transmit 223 the predetermined set of radio configuration profiles for a specific capability ID to the third device 130 for subsequent mapping update and mapping retrieving procedure. Also, the fourth device 140 may transmit 224 the predetermined set of radio configuration profiles for the capability ID to the first device 120-1.

If the second device 110 transmits 225 a capability ID of the second device associated with at least one radio capability for the radio access, the first device 120-1 may retrieve a set of radio configuration profiles corresponding to this capability ID from the third device 130.

In some example embodiments, the first device 120-1 may determine a state of the radio access of the second device 110 and generate a retrieving request based on the capability ID and the state of the radio access. The first device 120-1 transmit 230 the retrieving request to the third device 130.

The third device 130 may determine the capability ID and the state of the radio access from the retrieving request. Since the third device 130 maintains the plurality of sets of reference radio configuration profiles and the state of the radio access for the corresponding to the capability IDs, based on the received capability ID and the state, the third device 130 may determine 235 a set of radio configuration profiles and transmit 240 the set of radio configuration profiles to the first device 120-1. That is, the mapping of the capability ID of the second device, the state of the radio access and the set of radio configuration profiles may be retrieved from the third device 130 to the first device 120-1. In this way, the first device 120-1 may not need to store the plurality of sets of reference radio configuration profiles for multiple of capability IDs, which has been transmitted to and maintained in the third device 130, and may obtain the specific set of radio configuration profiles for a requested capability ID during the mapping retrieving procedure actions 230-240).

Alternatively, if the first device 120-1 stores the plurality of sets of reference radio configuration profiles for capability IDs, which is obtained from the third device 130, the first device 120-1 may determine 245 the set of radio configuration profiles based on the capability ID of the second device from the plurality of sets of reference radio configuration profiles.

As a further option, if the first device 120-1 obtains a predetermined set of radio configuration profiles for a specific capability ID from the O&M node, the first device 120-1 may determine whether the capability ID of the second device matches the specific capability ID. If the capability ID of the second device matches the specific capability ID, the first device 120-1 may determine the predetermined set of radio configuration profiles as the set of radio configuration profiles.

Then, the first device 120-1 may transmit 250 the set of radio configuration profiles to the second device 110 for an RRC reconfiguration. The set of radio configuration profiles may be transmitted via a higher layer RRC signaling. After the reception of the set of radio configuration profiles, the second device 110 may perform the radio access to the first device 120-1 based on the set of radio configuration profiles. Specifically, the second device 110 may select an expected radio configuration profile and establish 260 the connection with the first device 120-1.

Furthermore, the first device 120-1 may also transmit 255 an indication of the target configuration profile from the set of radio configuration profiles to the second device 110 to indicate an expect configuration profile to be activated for the RRC reconfiguration procedure.

If the RRC reconfiguration procedure is successfully completed, the second device 110 may generate a response message. The message response may comprise an indication of an activation radio configuration profile from the set of radio configuration profiles in this RRC reconfiguration procedure to indicate which radio configuration profile is used for establishing the connection. The second device 120-1 may transmit 265 the response message to the first device 120-1.

Furthermore, the first device 120-1 may also transmit a mapping between the capability indication and the set of radio configuration profiles in this RRC reconfiguration procedure. The second device 110 may store the mapping. If the second device 110 intends to establish a connection with the first device 120-1, or other gNB, such as a further first device 120-2, in a same network condition, the second device 110 may request a RRC connection procedure with its Capability ID and use the set of radio configuration profiles directly. If the first device 120-1 receives the Capability ID from the second device 110, the first device 120-1 may be aware of the set of radio configuration profiles to be used by the set of radio configuration profiles for establishing the connection.

As described above, the behaviors between the first device 120-1 and the second device 110 may be referred to as a mapping procedure towards to the second device. The second device 110 may request the respectively radio configuration profile with its capability ID and may store the obtained set of radio configuration profiles the mapping between its capability ID and this set of radio configuration profiles for a subsequent connection in same network condition.

Moreover, the second device 110 may request 275 for suspending the connection. In a case that the second device 110 initial a resuming procedure, the behaviors between the second device 110 and the first device 120-1 may be described as below. If the second device 110 intends to resume the connection from a suspending status. The second device 110 may transmit 280 a resuming request to the first device 120-1.

As an option, the second device 110 may indicate an expected radio configuration profile selected from the set of radio configuration profiles to the first device 120-1 in the resuming request. The first device 120-1 may determine 285 whether the expected radio configuration profile is available. For example, the second device 110 may request to use one or more radio configuration profile preferred by the second device 120. Thus, the expected radio configuration profile may be accepted or rejected by the first device 120-1. If the first device 120-1 agrees the expected radio configuration profile selected by the second device 110, the first device 120-1 may transmit 290 a resuming response to the second device 120. The resuming response may indicate that the connection is to be resumed based on the activation radio configuration profile.

Otherwise, the first device 120-1 may assign a specific radio configuration profile in the set of the radio configuration profile and transmit 290 the resuming response with an indication of the specific radio configuration profile to the second device 110.

Furthermore, the set of radio configuration profiles, which has been provided from the first device 120-1 to the second device 120 for a specific Capability ID, may also be transmit 270 to a further first device 120-2, if the second device 120 may be connected with both first device 120-1 and the further first device 120-2 in a dual-connection mode, or if the second device 120 may hand over from the first device 120-1 to the further first device 120-2, also in a case that the first device 120-1 is implemented as a gNB-CU and the further first device 120-2 is implemented as a gNB-DU. It should be understood that the further first device 120-2, in some case, may also perform the actions performed by the first device as mentioned above.

In this way, the additional network processing for generating a new radio configuration may be potentially saved and therefore the network efficiency for transmitting the radio configurations to the terminal device can be improved.

Figure 3:
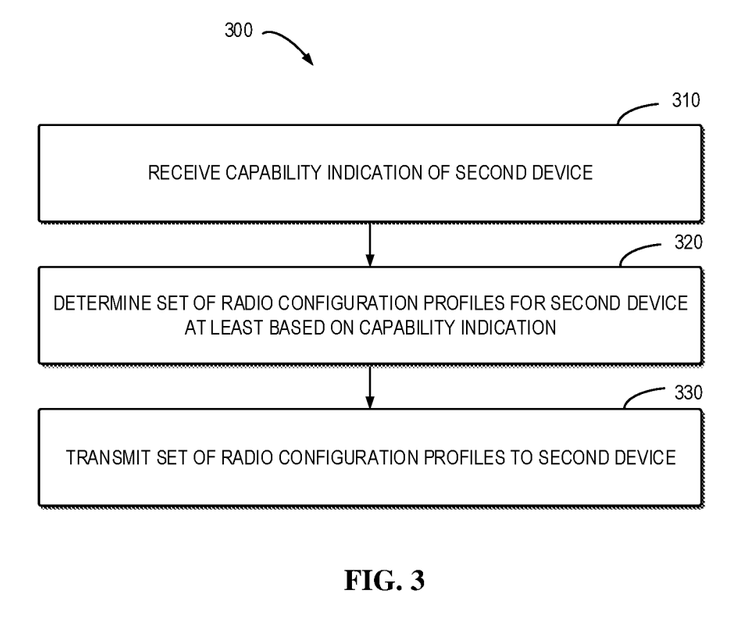
FIG. 3 shows a flowchart of a method implemented at a first device in accordance with some example embodiments of the present disclosure.

FIG. 3 shows a flowchart of an example method 300 implemented at a device in accordance with some example embodiments of the present disclosure. For the purpose of discussion, the method 300 will be described from the perspective of the first device 120-1 with reference to FIG. 1.

At 310, the first device 120-1 receives, from a second device 110, a capability indication of the second device 110. The capability indication may be associated with at least one capability of the second device 110 for performing radio access to the first device 120-1.

At 320, the first device 120-1 determines a set of radio configuration profiles for the second device 110 at least based on the capability indication. The set of radio configuration profiles may indicate a plurality of available configuration parameters of the radio access.

In some example embodiments, the first device 120-1 may determine a state of the radio access of the second device 110 and generate a retrieving request for the set of radio configuration profiles based on the capability indication of the second device and the state. The first device 120-1 may further transmits the retrieving request to a third device 130 and receive the set of radio configuration profiles from the third device 130.

In some example embodiments, the first device 120-1 may obtain, from a third device, a plurality of sets of reference radio configuration profiles for a set of capability indications and determine, from the plurality of sets of reference radio configuration profiles, the set of radio configuration profiles based on the capability indication of the second device.

In some example embodiments, the first device 120-1 may obtaining a predetermined set of radio configuration profiles corresponding to the capability indication of the second device from a fourth device and determining the predetermined set of radio configuration profiles as the set of radio configuration profiles.

At 330, the first device 120-1 transmits the set of radio configuration profiles to the second device 110, to cause the second device 110 to establish a connection with the first device 120-1.

In some example embodiments, the first device 120-1 may transmit, to the second device 110, a mapping between the capability indication and the set of radio configuration profiles.

In some example embodiments, the first device 120-1 may determine a target configuration profile from the set of radio configuration profiles for the second device 110 to establish the connection with the first device 120-1 and transmit an indication of the target configuration profile to the second device 120.

In some example embodiments, the first device 120-1 may receive, from the second device 120, a response message indicating that the connection has been established successfully, the response message comprising an indication of an activation radio configuration profile from the set of radio configuration profiles for the second device to establish the connection with the first device.

In some example embodiments, the first device 120-1 may receive, from the second device 110, a resuming request for resuming the connection from a suspending status, the resuming request comprising an indication of an activation radio configuration profile determined from the set of radio configuration profiles and transmit, to the second device 120, a resuming response indicating that the connection is to be resumed based on the activation radio configuration profile.

In some example embodiments, if the first device 120-1 receives, from the second device, a resuming request for resuming the connection from a suspending status, determining an activation radio configuration profile from the set of radio configuration profiles, the first device 120-1 may transmit, to the second device, a resuming response including an indication of the activation radio configuration profile and indicating that the connection is to be resumed based on the activation radio configuration profile.

In some example embodiments, the first device 120-1 may obtain a set of reference capability patterns of the second device from a third device. The first device 120-1 may further determine at least one reference state of the radio access of the second device and determine a plurality of sets of reference radio configuration profiles for the set of reference capability patterns based on capabilities indicated in the set of reference capability patterns and the at least one reference state. The first device 120-1 may also generate a set of correspondences of the set of reference capability patterns, the at least one reference state and the plurality of sets of reference radio configuration profiles and transmit, to the third device, the set of correspondences and the plurality of sets of reference radio configuration profiles.

In some example embodiments, the first device 120-1 may transmit the set of radio configuration profiles to a further first device 120-2 for the second device establishing a further connection with the further first device 120-2.

Figure 4:
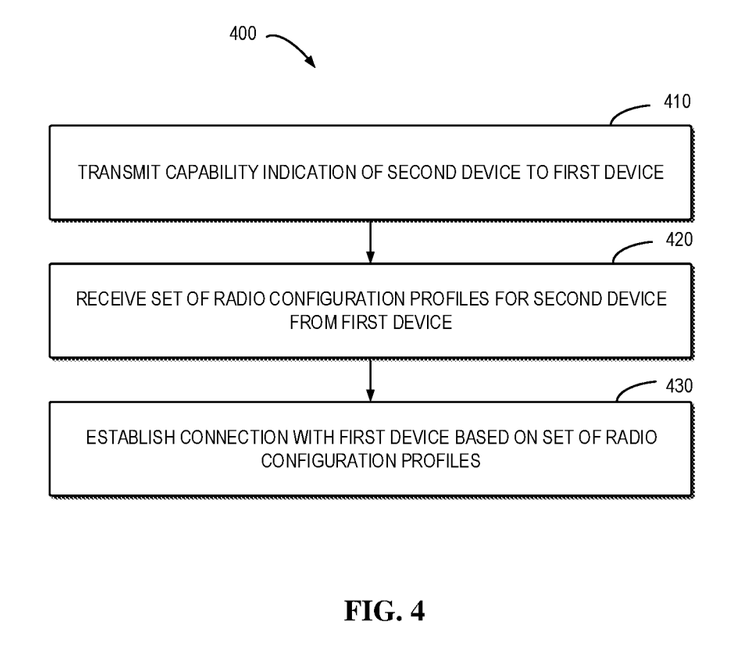
FIG. 4 shows a flowchart of a method implemented at a second device in accordance with some example embodiments of the present disclosure.

FIG. 4 shows a flowchart of an example method 400 implemented at a device in accordance with some example embodiments of the present disclosure. For the purpose of discussion, the method 400 will be described from the perspective of the second device 110 with reference to FIG. 1.

At 410, the second device 110 transmits a capability indication of the second device to a first device. The capability indication may be associated with at least one capability of the second device for performing radio access to the first device.

At 420, the second device 110 receives a set of radio configuration profiles for the second device from the first device. The set of radio configuration profiles may indicate a plurality of available configuration parameters of the radio access At 430, the second device 110 establishes a connection with the first device based on the set of radio configuration profiles.

In some example embodiments, if the second device 110 receives a mapping between the capability indication and the set of radio configuration profiles from the first device, the second device 110 may store the mapping for performing a subsequent radio access to the first device with the capability pattern.

In some example embodiments, the second device 110 may receive an indication of a target configuration profile from the set of radio configuration profiles for the second device to establish the connection with the first device and establish the connection based on the target configuration profile.

In some example embodiments, the second device 110 may generate a response message indicating that the connection has been established successfully, the response message comprising an indication of an activation radio configuration profile from the set of radio configuration profiles for the second device to establish the connection with the first device and transmit the response message to the first device.

In some example embodiments, the second device 110 may generate a resuming request for resuming the connection from a suspending status, the resuming request comprising an indication of an activation radio configuration profile determined from the set of radio configuration profiles. The second device 110 may further transmit the resuming request to the first device and receive, from the first device, a resuming response indicating that the connection is to be resumed based on the activation radio configuration profile.

In some example embodiments, the second device 110 may transmit, to the first device, a resuming request for resuming the connection from a suspending status, the resuming request comprising an indication of an activation radio configuration profile from the set of radio configuration profiles and receive, from the first device, a resuming response including an indication of the activation radio configuration profile and indicating that the connection is to be resumed based on an activation radio configuration profile determined from the set of radio configuration profiles.

Figure 5:
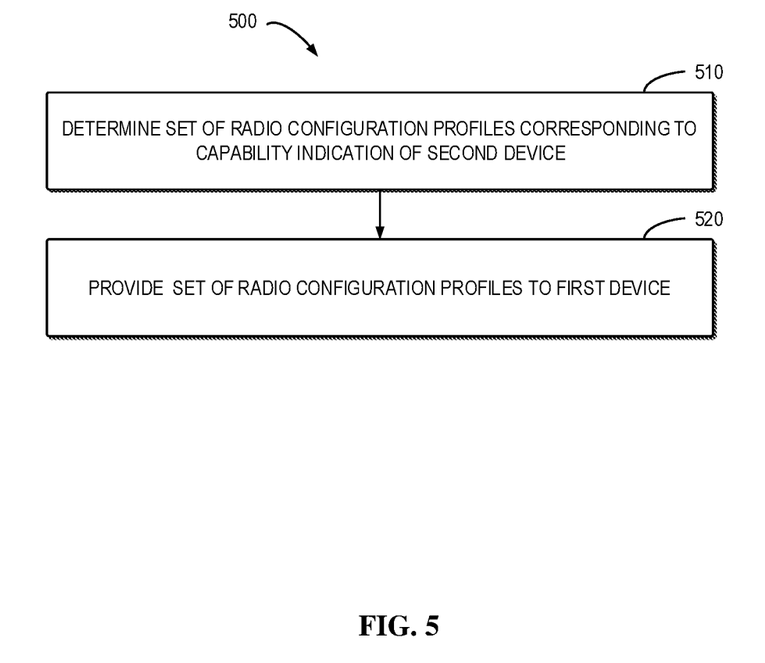

FIG. 5 shows a flowchart of an example method 500 implemented at a device in accordance with some example embodiments of the present disclosure. For the purpose of discussion, the method 500 will be described from the perspective of the third device 130 with reference to FIG. 1.

At 510, the third device 130 determines a set of radio configuration profiles corresponding to a capability indication of a second device 110. The capability indication may be associated with at least one capability of the second device 110 for performing radio access to a first device 120-1. The set of radio configuration profiles may indicate a plurality of available configuration parameters of the radio access.

At 520, the third device 130 provides the set of radio configuration profiles to the first device 120-1.

In some example embodiments, the third device 130 may transmit a set of reference capability patterns of the second device 110 to the first device 120-1 and receive, from the first device 120-1, a plurality of sets of reference radio configuration profiles for the set of reference capability patterns and a set of correspondences of the set of reference capability patterns, at least one reference state and the plurality of sets of reference radio configuration profiles.

In some example embodiments, if the third device 130 receives, from the first device, a retrieving request for the set of radio configuration profiles for the second device, the third device 130 may determine the capability indication of the second device and a state of the radio access of the second device from the retrieving request. Further, the third device 130 may determine, from the plurality of sets of reference radio configuration profiles, the set of radio configuration profiles based on the capability indication of the second device, the state of the radio access of the second device and the set of correspondences.

In some example embodiments, the third device 130 may obtain a set of reference capability patterns of the second device and determine at least one reference state of the radio access of the second device. The third device 130 may further determine a plurality of sets of reference radio configuration profiles based on the set of reference capability patterns and the at least one reference state and determine, from the plurality of sets of reference radio configuration profiles, the set of radio configuration profiles for a reference capability pattern having the capability indication in the set of reference capability patterns.

In some example embodiments, an apparatus capable of performing any of the method 300 (for example, the first device 120-1) may comprise means for performing the respective steps of the method 300. The means may be implemented in any suitable form. For example, the means may be implemented in a circuitry or software module.

In some example embodiments, the apparatus comprises means for receiving from a second device, a capability indication of the second device, the capability indication associated with at least one capability of the second device for performing radio access to the first device; means for receiving, from a third device, a set of radio configuration profiles for the second device at least based on the capability indication, the set of radio configuration profiles indicating a plurality of available configuration parameters of the radio access; and means for transmitting the set of radio configuration profiles to the second device, to cause the second device to establish a connection with the first device.

In some example embodiments, an apparatus capable of performing any of the method 400 (for example, the second device 110) may comprise means for performing the respective steps of the method 400. The means may be implemented in any suitable form. For example, the means may be implemented in a circuitry or software module.

In some example embodiments, the apparatus comprises means for transmitting, from a second device, a capability indication of the second device to a first device, the capability indication associated with at least one capability of the second device for performing radio access to the first device; means for receiving a set of radio configuration profiles for the second device from the first device, the set of radio configuration profiles indicating a plurality of available configuration parameters of the radio access; and means for establishing a connection with the first device based on the set of radio configuration profiles.

In some example embodiments, an apparatus capable of performing any of the method 500 (for example, the third device 130) may comprise means for performing the respective steps of the method 500. The means may be implemented in any suitable form. For example, the means may be implemented in a circuitry or software module.

In some example embodiments, the apparatus comprises means for means for receiving, from a first device, a retrieving request for a set of radio configuration profiles for a second device, the set of radio configuration profiles indicating a plurality of available configuration parameters of radio access; means for determining, from the retrieving request, a capability indication and a state of the radio access of the second device, the capability pattern associated with at least one capability of the second device for performing the radio access to the first device; means for determining the set of radio configuration profiles based on the capability indication and the state; and means for transmitting the set of radio configuration profiles to the first device.

Figure 6:
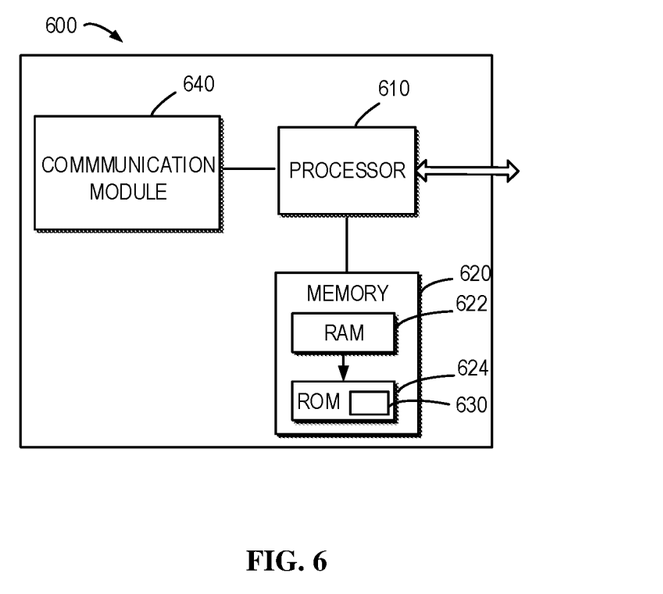
FIG. 6 illustrates a simplified block diagram of an apparatus that is suitable for implementing some other embodiments of the present disclosure.

FIG. 6 is a simplified block diagram of a device 600 that is suitable for implementing embodiments of the present disclosure. The device 600 may be provided to implement the communication device, for example the first device 110, the second device 120, the third device 130 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 624. The processor 610 may perform any suitable actions and processing by loading the program 630 into the RAM 622.

The embodiments of the present disclosure may be implemented by means of the program 630 so that the device 600 may perform any process of the disclosure as discussed with reference to FIGS. 2 to 5. The embodiments of the present disclosure may also be implemented by hardware or by a combination of software and hardware.

Figure 7:
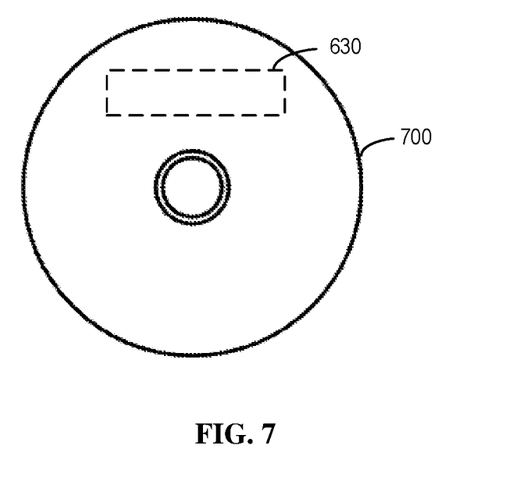
FIG. 7 illustrates a block diagram of an example computer readable medium in accordance with some example embodiments of the present disclosure.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 300, 400 and 500 as described above with reference to FIGS. 3, 4 and 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A second device comprising:
    at least one processor; and
    at least one memory including computer program codes;
    the at least one memory and the computer program codes are configured to, with the at least one processor, cause the second device at least to:
    transmit a capability indication of the second device to a first device, the capability indication associated with at least one capability of the second device for performing radio access to the first device;
    receive a set of radio configuration profiles for the second device from the first device, the set of radio configuration profiles indicating a plurality of available configuration parameters of the radio access;
    establish a connection with the first device based on the set of radio configuration profiles;
    request suspension of the connection with the first device;
    generate and transmit a resuming request to the first device to initiate a resumption of connection procedure with the first device, the resuming request comprising an expected radio configuration profile selected from the set of radio configuration profiles received from the first device; and
    receive a resuming response from the first device, the resuming response comprising an indication that the connection is to be resumed based on the radio configuration profile active before transmission of the request for suspension, or receive a resuming response from the first device, the resuming response comprising an indication that the connection is to be resumed based on a specific radio configuration profile selected by the first device, the specific radio configuration profile comprising a radio configuration profile that is different to the radio configuration profile that was active before transmission of the request for suspension,
    wherein the second device is caused to establish the connection by:
    receiving an indication of a target configuration profile from the set of radio configuration profiles for the second device to establish the connection with the first device; and
    establishing the connection based on the target configuration profile,
    wherein the second device is further caused to:
    in response to receiving a mapping between the capability indication and the set of radio configuration profiles from the first device, store the mapping for performing a subsequent radio access to the first device with a capability pattern,
    generate a response message indicating that the connection has been established successfully, the response message comprising an indication of an activation radio configuration profile from the set of radio configuration profiles for the second device to establish the connection with the first device; and
    transmit the response message to the first device,
    wherein when the second device intends to establish a connection with a further first device in a same network condition, the second device requests a radio resource control connection procedure with the capability indication and uses the set of radio configuration profiles directly with the further first device using the stored mapping.

2. A method comprising:
    transmitting, from a second device, a capability indication of the second device to a first device, the capability indication associated with at least one capability of the second device for performing radio access to the first device;
    receiving a set of radio configuration profiles for the second device from the first device, the set of radio configuration profiles indicating a plurality of available configuration parameters of the radio access;
    establishing a connection with the first device based on the set of radio configuration profiles;
    requesting suspension of the connection with the first device;
    generating and transmitting a resuming request to the first device to initiate a resumption of connection procedure with the first device, the resuming request comprising an expected radio configuration profile selected from the set of radio configuration profiles received from the first device; and
    receiving a resuming response from the first device, the resuming response comprising an indication that the connection is to be resumed based on the radio configuration profile active before transmission of the request for suspension, or receive a resuming response from the first device, the resuming response comprising an indication that the connection is to be resumed based on a specific radio configuration profile selected by the first device, the specific radio configuration profile comprising a radio configuration profile that is different to the radio configuration profile that was active before transmission of the request for suspension,
    wherein establishing the connection comprises:
    receiving an indication of a target configuration profile from the set of radio configuration profiles for the second device to establish the connection with the first device; and
    establishing the connection based on the target configuration profile, the method further comprising:
in response to receiving a mapping between the capability indication and the set of radio configuration profiles from the first device, storing the mapping for performing a subsequent radio access to the first device with a capability pattern,
generating a response message indicating that the connection has been established successfully, the response message comprising an indication of an activation radio configuration profile from the set of radio configuration profiles for the second device to establish the connection with the first device; and
transmitting the response message to the first device,
wherein when the second device intends to establish a connection with a further first device in a same network condition, the second device requests a radio resource control connection procedure with the capability indication and uses the set of radio configuration profiles directly with the further first device using the stored mapping.

3. A non-transitory computer readable medium comprising data instructions stored thereon for causing a computer processor in a second device to perform at least the following:
transmitting a capability indication of the second device to a first device, the capability indication associated with at least one capability of the second device for performing radio access to the first device;
receiving a set of radio configuration profiles for the second device from the first device, the set of radio configuration profiles indicating a plurality of available configuration parameters of the radio access;
establishing a connection with the first device based on the set of radio configuration profiles;
requesting suspension of the connection with the first device;
generating and transmitting a resuming request to the first device to initiate a resumption of connection procedure with the first device, the resuming request comprising an expected radio configuration profile selected from the set of radio configuration profiles received from the first device; and
receiving a resuming response from the first device, the resuming response comprising an indication that the connection is to be resumed based on the radio configuration profile active before transmission of the request for suspension, or receive a resuming response from the first device, the resuming response comprising an indication that the connection is to be resumed based on a specific radio configuration profile selected by the first device, the specific radio configuration profile comprising a radio configuration profile that is different to the radio configuration profile that was active before transmission of the request for suspension,
wherein establishing the connection comprises:
receiving an indication of a target configuration profile from the set of radio configuration profiles for the second device to establish the connection with the first device; and establishing the connection based on the target configuration profile,
the non-transitory computer readable medium further comprising program instructions for causing the second device to perform:
in response to receiving a mapping between the capability indication and the set of radio configuration profiles from the first device, storing the mapping for performing a subsequent radio access to the first device with a capability pattern;
generating a response message indicating that the connection has been established successfully, the response message comprising an indication of an activation radio configuration profile from the set of radio configuration profiles for the second device to establish the connection with the first device; and
transmitting the response message to the first device,
wherein when the second device intends to establish a connection with a further first device in a same network condition, the non-transitory computer readable medium further comprises program instructions for causing the second device to perform: requesting a radio resource control connection procedure with the capability indication and using the set of radio configuration profiles directly with the further first device using the stored mapping.

4. The second device of claim 1, wherein the at least one radio capability supported by the second device comprises a size of the of an antenna matrix and parameters related to bandwidth and frequency.

5. The second device of claim 1, wherein the set of radio configuration profiles that have been provided from the first device to the second device for a specific capability indication are transmitted to a further first device when the second device is connected with both the first device and the further first device in a dual-connection mode.

6. The second device of claim 1, wherein the set of radio configuration profiles that have been provided from the first device to the second device for a specific capability indication are transmitted to a further first device when the second device hands over from the first device to the further first device.

7. The second device of claim 1, wherein the set of radio configuration profiles that have been provided from the first device to the second device for a specific capability indication are transmitted to a further first device when the first device is implemented as a gNB-CU and the further first device is implemented as a gNB-DU.

8. The second device of claim 1, wherein the second device comprises a terminal device and the first device comprises a network device.

9. The method of claim 2, wherein the at least one radio capability supported by the second device comprises a size of the of an antenna matrix and parameters related to bandwidth and frequency.

10. The method of claim 2, wherein the set of radio configuration profiles that have been provided from the first device to the second device for a specific capability indication are transmitted to a further first device when the second device is connected with both the first device and the further first device in a dual-connection mode.

11. The method of claim 2, wherein the set of radio configuration profiles that have been provided from the first device to the second device for a specific capability indication are transmitted to a further first device when the second device hands over from the first device to the further first device.

12. The method of claim 2, wherein the set of radio configuration profiles that have been provided from the first device to the second device for a specific capability indication are transmitted to a further first device when the first device is implemented as a gNB-CU and the further first device is implemented as a gNB-DU.

13. The non-transitory computer readable medium of claim 3, wherein the at least one radio capability supported by the second device comprises a size of the of an antenna matrix and parameters related to bandwidth and frequency.

14. The non-transitory computer readable medium of claim 3, wherein the set of radio configuration profiles that have been provided from the first device to the second device for a specific capability indication are transmitted to a further first device when the second device is connected with both the first device and the further first device in a dual-connection mode.

15. The non-transitory computer readable medium of claim 3, wherein
the set of radio configuration profiles that have been provided from the first device to the second device for a specific capability indication are transmitted to a further first device when the second device hands over from the first device to the further first device.

16. The non-transitory computer readable medium of claim 3, wherein the set of radio configuration profiles that have been provided from the first device to the second device for a specific capability indication are transmitted to a further first device when the first device is implemented as a gNB-CU and the further first device is implemented as a gNB-DU.

* * * * *